(12) United States Patent
Deng et al.

(10) Patent No.: US 11,817,745 B2
(45) Date of Patent: Nov. 14, 2023

(54) ELECTRIC MACHINE ROTOR AND VEHICLE ELECTRIC MACHINE CONTAINING THE SAME (71) Applicant: FORD GLOBAL TECHNOLOGIES, LLC, Dearborn, MI (US)

(72) Inventors: Chuan Deng, Nanjing (CN); Guohua Du, Nanjing (CN); Yigang Yuan, Nanjing (CN)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 35 days.

(21) Appl. No.: 17/546,458

(22) Filed: Dec. 9, 2021

(65) Prior Publication Data
US 2022/0181929 A1 Jun. 9, 2022

(30) Foreign Application Priority Data

Dec. 9, 2020 (CN) .......................... 202011429551.1

(51) Int. Cl.
H02K 1/27 (2022.01)
H02K 1/276 (2022.01)
H02K 29/03 (2006.01)

(52) U.S. Cl.
CPC ............. *H02K 1/276* (2013.01); *H02K 29/03* (2013.01)

(58) Field of Classification Search
CPC ...... H02K 1/276; H02K 29/03; H02K 1/2766; H02K 1/274; B60K 6/26; B60K 2006/264
See application file for complete search history.

(56) References Cited

U.S. PATENT DOCUMENTS 9,479,017 B2  10/2016  Hao et al.
2022/0209600 A1*  6/2022  Hisada .................. H02K 1/2766

FOREIGN PATENT DOCUMENTS

CN  108566004 A  9/2018
CN  110212666 A  9/2019
WO  2020021788 A1  1/2020

OTHER PUBLICATIONS

"Periphery, n." OED Online. Oxford University Press, Mar. 2023. Web. Jul. 11, 2023. (Year: 2023).*

* cited by examiner

*Primary Examiner* — Thomas Truong
(74) *Attorney, Agent, or Firm* — BROOKS KUSHMAN PC; David Kelley (57) ABSTRACT An electric machine rotor includes a rotor core having pairs of magnets circumferentially distributed around the rotor core, each magnet pair forming a V-shaped configuration with an opening facing an outer periphery of the rotor core, and first and second slots inside the V-shaped configuration that form a magnetic bridge. Sides of the magnetic bridge are angled toward the outer periphery.

15 Claims, 5 Drawing Sheets

ELECTRIC MACHINE ROTOR AND VEHICLE ELECTRIC MACHINE CONTAINING THE SAME

CROSS-REFERENCE TO RELATED APPLICATIONS

This application claims foreign priority benefits under 35 U.S.C. § 119(a)-(d) to CN Application 2020 114 295 511 filed Dec. 9, 2020, the disclosure of which is hereby incorporated by reference in its entirety.

TECHNICAL FIELD

The present disclosure generally relates to electric machine technology, and more specifically, to an electric machine rotor and a vehicle electric machine containing the same.

BACKGROUND

Permanent magnet electric machines have magnets mounted on or embedded in a rotor surrounded by a stator. The magnets on the rotor are coupled with an internal magnetic field caused by current in the electric machine and generated by the electrical input to the stator winding. Torque generated by the stator winding and the rotor flux field forms a uniform torque component and a variable torque component. Total output torque of the electric machine is a combination of the two components. However, a torque ripple phenomenon is produced due to the variable torque component. The torque ripple in the electric machines is caused by the interaction between the harmonic magnetic flux generated by the permanent magnet and the current in the stator winding.

The torque ripple will cause instantaneous output torque to continuously change with time and fluctuate around a certain average value at the same time during the rotation of the electric machine. If the torque ripple is large, the stability when dragging the load is low. That is to say, the jitter is very large, and the stability of the speed may be affected with associated increased energy consumption of the electric machine.

To solve such problems, some solutions have been proposed to reduce the torque ripple by adjusting the local structure of the rotor or the stator. For example, published patent application document US2016/0028279A1 proposes a rotor for a permanent magnet synchronous electric machine, in which a first layer of cavities is circumferentially formed within the rotor core structure. Pairs of the cavities in the first layer form V-shaped configurations and are circumferentially spaced about the rotor core structure in the first layer. A second layer of cavities is circumferentially formed within the rotor core structure. Pairs of the cavities in the second layer form V-shaped configurations and are circumferentially spaced about the rotor core structure in the second layer. A first set of permanent magnets is inserted within each cavity in the first layer, and a second set of permanent magnets is inserted within each cavity in the second layer. Each respective V-shaped configuration of the second layer having permanent magnets disposed therein extend greater than half a radial distance from the outer cylindrical wall to the inner cylindrical wall.

Inventors of the present disclosure have realized that there is still room for further improvement in this type of solution in the prior art.

SUMMARY

The present disclosure summarizes aspects of the embodiments and should not be used to limit the claims. Other implementations are contemplated in accordance with the techniques described herein, as will be apparent to those of ordinary skill in the art upon examination of the following drawings and detailed description, and such implementations are intended to be within the scope of the claimed subject matter.

The inventors of the present disclosure have realized that there is a need for an electric machine rotor and a vehicle electric machine containing the same, which can significantly reduce the torque ripple by simply changing the local topology of the rotor laminations without reducing the torque, thereby improving output stability and reducing the overall energy consumption of the electric machine.

According to an aspect of the present disclosure, an electric machine rotor including a rotor core includes pairs of magnets circumferentially distributed along the rotor core, each pair of magnets jointly forming a V-shaped configuration with an opening facing an outer periphery of the rotor core, and a first slot and a second slot inside the V-shaped configuration, between which a magnetic bridge being formed, both sides of the magnetic bridge being respectively bent in a direction of the outer periphery, and at least a part of a middle portion of the magnetic bridge being arched toward the direction of the outer periphery.

According to an embodiment of the present disclosure, the second slot is located between the first slot and the outer periphery and is perpendicular to a central axis of the V-shaped configuration, and the first slot has side wing portions on both sides that are inclined to the direction of the second slot and a first main body portion between the side wing portions that is parallel to the second slot and widens toward the direction of the second slot in a part of a middle portion.

According to an embodiment of the present disclosure, the first main body portion includes a transition area at both ends and a platform area in the middle, the transition area has a side that faces the second slot and slope from the side wing portion to the direction of the second slot, and the platform area has sides that are parallel to each other.

According to an embodiment of the present disclosure, the second slot is narrowed in a middle portion to form a second main body portion that corresponds to and has sides parallel to the platform area of the first slot.

According to an embodiment of the present disclosure, the second slot further includes widened portions located on both sides of the second main body portion, each of the widened portions includes an end side area and a connection area connecting the end side area to the second main body portion, the connection area has a side that faces the first slot and is parallel to the adjacent side of the transition area of the first slot, and the end side area has a side that faces the first slot and is parallel to the adjacent side of the side wing portion of the first slot.

According to an embodiment of the present disclosure, the widened portions of the second slot have a maximum width greater than or equal to two times a width of the second main body portion.

According to an embodiment of the present disclosure, the platform area of the first slot has a width greater than or equal to twice a width of the side wing portion of the first slot.

According to an embodiment of the present disclosure, the magnetic bridge has a uniform width in all parts.

According to an embodiment of the present disclosure, the rotor core further includes a groove-shaped portion located radially inward of the magnetic bridge.

According to an embodiment of the present disclosure, the groove-shaped portion is located between radially inward ends of each pair of magnets constituting the V-shaped configuration.

According to an aspect of the present disclosure, an electric machine rotor including a rotor core is provided, the rotor core including pairs of permanent magnets circumferentially distributed along the rotor core, each pair of permanent magnets jointly forming a V-shaped configuration with an opening facing an outer periphery of the rotor core, and a first slot and a second slot inside the V-shaped configuration, between which a magnetic bridge being formed, both sides of the magnetic bridge being respectively bent in a direction of the outer periphery, and at least a part of a middle portion of the magnetic bridge being offset toward the direction of the outer periphery to form a piecewise linear arch.

According to an embodiment of the present disclosure, the second slot is located between the first slot and the outer periphery and is perpendicular to a central axis of the V-shaped configuration, and the first slot has side wing portions on both sides that are inclined to the direction of the second slot and a first main body portion that is parallel to the second slot and widens toward the direction of the second slot in a part of a middle portion.

According to an embodiment of the present disclosure, the first main body portion includes a transition area at both ends and a platform area in the middle, the transition area has a side that faces the second slot and slope from the side wing portion to the direction of the second slot, and the platform area has sides that are parallel to each other.

According to an embodiment of the present disclosure, the second slot is narrowed in a middle portion to form a second main body portion corresponding to and parallel to the platform area of the first slot.

According to an embodiment of the present disclosure, the second slot further includes widened portions located on both sides of the second main body portion, each of the widened portions includes an end side area and a connection area connecting the end side area to the second main body portion, the connection area has a side that faces the first slot and is parallel to the adjacent side of the transition area of the first slot, and the end side area has a side that faces the first slot and is parallel to the adjacent side of the side wing portion of the first slot.

According to an embodiment of the present disclosure, the widened portions of the second slot have a maximum width greater than or equal to twice a width of the second main body portion.

According to an embodiment of the present disclosure, the platform area of the first slot has a width greater than or equal to twice a width of the side wing portion of the first slot.

According to an embodiment of the present disclosure, the magnetic bridge has a uniform width in all parts.

According to an embodiment of the present disclosure, the rotor core further includes a groove-shaped portion located radially inward of the magnetic bridge.

According to an aspect of the present disclosure, a vehicle electric machine, comprising the electric machine rotor as described above is also provided.

BRIEF DESCRIPTION OF THE DRAWINGS

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the teachings of the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In this application, when an element or a part is referred to as being "on", "joined to", "connected to" or "coupled to" another element or part, the element or part may be directly on another element or part, joined, connected or coupled to another element or part, or there may be intervening elements or parts. In contrast, when an element is referred to as being "directly on", "directly joined to", "directly connected to" or "directly coupled to" another element or part, there may be no intervening elements or parts. Other words used to describe the relationship between elements should be interpreted in a similar manner.

As mentioned in the background above, the inventors of the present disclosure have realized that in the solutions in the prior art, there is still room for improvement in terms of how to significantly reduce the torque ripple by simply changing the local topology of the rotor laminations without reducing the torque, thus to improve output stability and reduce the overall energy consumption of the electric machine. For example, the inventors have realized that certain adjustments to the topology of the rotor lamination on the electric machine that are used to house the stator winding can significantly reduce the torque ripple. In view of these problems in the prior art, the inventors of the present disclosure propose an electric machine rotor and a vehicle electric machine containing the same in one or more embodiments, which is believed to be able to solve one or more problems in the prior art.

In existing electric machines, such as permanent magnet electric machines, the magnets mounted on or embedded in the rotor of the electric machine are coupled with the internal magnetic field caused by the current in the electric machine stator. The individual stator teeth and stator winding form a plurality of magnetic poles that generate a flux flow pattern when a multi-phase sinusoidal voltage and current pass through the stator winding coils. For example, a three-phase electric machine will have a total of eight poles and 48 slots. The flux generated by the stator windings interacts with rotor flux generated by the magnets in the electric machine rotor, so that a rotor torque is generated when the stator windings are excited by a polyphase voltage.

Figure 3:
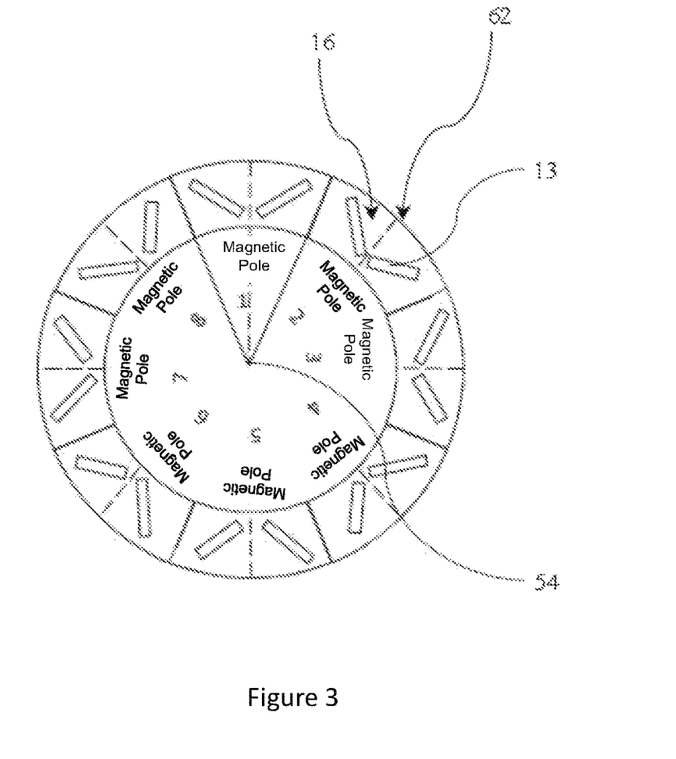
FIG. 3 shows a schematic diagram of an end face of an electric machine rotor according to one or more embodiments of the present disclosure.

The magnets of the rotor may be positioned or oriented in different ways to generate the desired magnetic field. Each magnetic pole may be formed by a single magnet oriented in a radially outward direction with one magnetic pole (i.e., north or south pole). The magnetic poles of the rotor may also be formed by multiple sets of magnets arranged to form the magnetic poles together. One such arrangement orients the magnets in a V-shaped configuration. An inner part of the "V" has similar magnetic poles that cooperate to form a rotor pole, as shown in FIG. 3, for example. Each magnet can be placed in an elongated aperture to maintain its position. These elongated apertures or holes are generally rectangular and are arranged to match the shape of the magnets. The elongated holes may be slightly larger at opposite ends to limit leakage of flux between the north and south poles of the individual magnets. Voids or cavities in a rotor core hinder the flux because vacuum has a relatively low magnetic permeability compared to materials of the rotor core (e.g., electrical steel).

Figure 1:
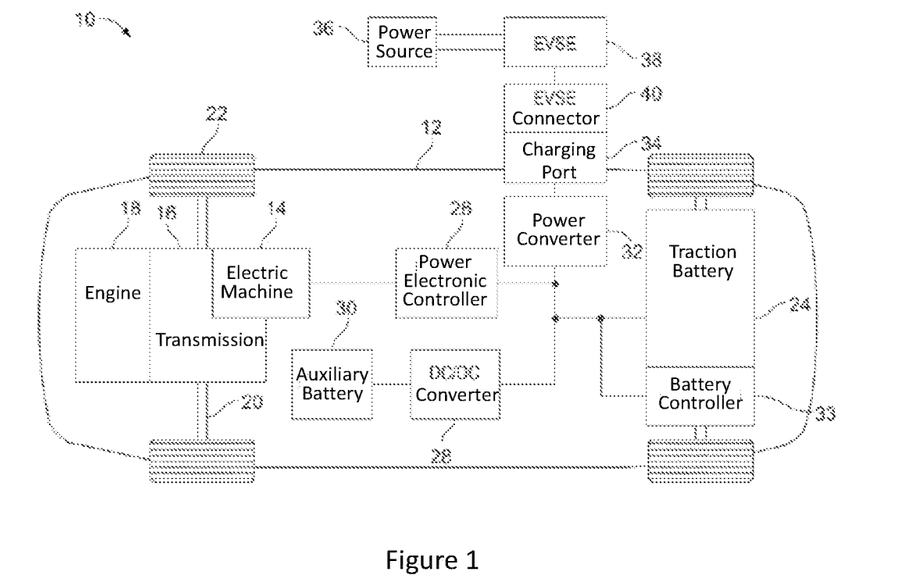
FIG. 1 shows a block diagram of an electric vehicle including a vehicle electric machine according to one or more embodiments of the present disclosure.

FIG. 1 depicts a block diagram of an electrified vehicle 12 including an electric machine rotor or a vehicle electric machine according to one or more embodiments of the present disclosure. In the context of the present disclosure, the electrified vehicle 12 may be, for example, a plug-in hybrid electric vehicle (PHEV), a full hybrid electric vehicle (FHEV), a mild hybrid electric vehicle (MHEV), a battery electric vehicle (BEV), etc. . . .

In the embodiment of FIG. 1, the vehicle 12 includes one or more electric machines 14 mechanically connected to a hybrid transmission 16. The electric machine 14 can operate as a motor or a generator. In addition, the hybrid transmission 16 may be mechanically connected to an engine 18. The hybrid transmission 16 may also be mechanically connected to a drive shaft 20, which is mechanically connected to wheels 22. When the engine 18 is activated or shut down, the electric machine 14 may provide propulsion and/or braking. The electric machine 14 can also be operated as a generator, and can provide fuel economy benefits by recovering energy that is normally lost as heat in a friction braking system. The electric machine 14 can also provide reduced pollutant emissions because the hybrid electric vehicle 12 can be operated in an electric mode or a hybrid mode under certain conditions, which can reduce the overall fuel consumption of the vehicle 12.

A traction battery (or battery pack) 24 stores and provides energy that can be used by the electric machine 14. The traction battery 24 may provide a high voltage DC (direct current) output from one or more battery cell arrays (sometimes referred to as a battery cell stack) within the traction battery 24. The battery cell array may include one or more battery cells. The traction battery 24 may be electrically connected to one or more power electronic controllers 26 through one or more contactors (not shown). One or more contactors isolate the traction battery 24 from other components when opened, and connect the traction battery 24 to the other components when closed.

The power electronic controller 26 may also be electrically connected to the electric machine 14 and may be configured to transfer electric energy between the traction battery 24 and the electric machine 14 in both directions. For example, the traction battery 24 may provide a DC voltage, while the electric machine 14 may require a three-phase AC (alternating current) voltage when running. The power electronic controller 26 can convert the DC voltage into the three-phase AC voltage according to the requirements of the electric machine 14. In a regenerative mode, the power electronic controller 26 can convert the three-phase AC voltage from the electric machine 14 acting as a generator into the DC voltage required by the traction battery 24. Those skilled in the art can understand that the parts described herein are also applicable to pure electric vehicles. For the pure electric vehicle, the hybrid transmission 16 may be a gear box connected to the electric machine 14, and the engine 18 can be absent.

In addition to providing energy for propulsion, the traction battery 24 can also provide energy for other vehicle electrical systems. A DC/DC converter 28 can convert the high-voltage DC output of the traction battery 24 into a low-voltage DC power source compatible with other vehicle loads. Other high-voltage loads (such as compressors and electric heaters) can be directly connected to the high-voltage without using the DC/DC converter 28. A low-voltage system may be electrically connected to an auxiliary battery 30 (for example, a 12V battery).

A battery controller 33 may communicate with the traction battery 24. The battery controller 33 may be configured to monitor and manage the operation of the traction battery 24, such as by an electronic monitoring system (not shown) that manages the temperature and state of charge of each battery cell.

The traction battery 24 can be recharged by an external power source 36. The external power source 36 may be a connection to a power socket. The external power source 36 may be electrically connected to an electric vehicle supply equipment (EVSE) 38. The EVSE 38 may provide circuits and controls for managing the power transfer between the power source 36 and the vehicle 12. The external power source 36 may provide DC or AC power to the EVSE 38.

The EVSE 38 may have a charging connector 40 for plugging into a charging port 34 of the vehicle 12. The charging port 34 may be any type of port configured to transfer power from the EVSE 38 to the vehicle 12. The charging port 34 may be electrically connected to a charger or a power converter 32. The power converter 32 may adjust the power supplied from the EVSE 38 to provide the traction battery 24 with appropriate voltage and current levels. The power converter 32 may interface with the EVSE 38 to coordinate power delivery to the vehicle 12. The EVSE connector 40 may have pins that mate with corresponding grooves of the charging port 34.

Figure 2:
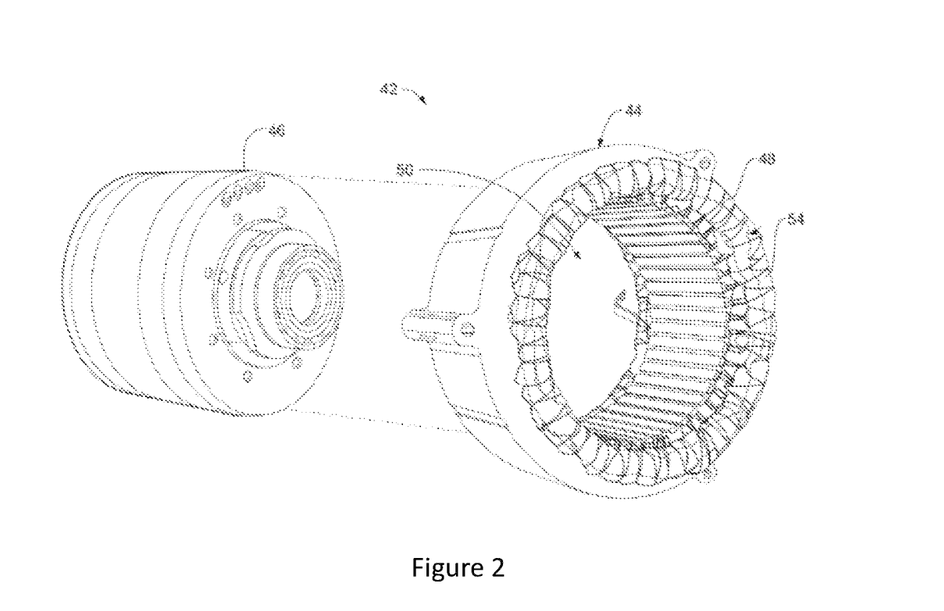
FIG. 2 shows a schematic diagram of a representative electric machine according to one or more embodiments of the present disclosure.

FIG. 2 shows a representative electric machine according to one or more embodiments of the present disclosure, generally referred to herein as electric machine 42. The electric machine 42 may include a stator 44 and a rotor 46. In some embodiments for vehicles, the electrified vehicle 12 may include two electric machines. One electric machine can be operated mainly as a motor, and the other electric machine can be operated mainly as a generator. The motor can be used to convert electric power into mechanical power, and the generator can be used to convert mechanical power into electric power.

In one example, referring to FIG. 2, the stator 44 may define a cavity 50. The rotor 46 can be sized to be set and operated in the cavity 50. A shaft (not shown) operatively connected to the rotor 46 can drive the rotor 46 to rotate and/or transfer rotational energy generated by the operation of the rotor 46 to one or more subsystems of the vehicle 12. The stator 44 may include a winding 48 disposed around an outer periphery of the cavity 50 to surround an outer surface of the rotor 46. In the example of the electric machine operated as a motor, current may be fed to the winding 48 to rotate the rotor 46. In the example of the electric machine operated as a generator, current can be generated in the winding 48 by the rotation of the rotor 46 so as to power the components of the vehicle 12.

FIG. 3 shows a schematic view of an end face of an electric machine rotor according to one or more embodiments of the present disclosure. Pairs of magnets 13 are circumferentially distributed on the rotor core 62, and each pair of magnets 13 together constitute a corresponding magnetic pole. In the embodiment shown in FIG. 3, a total of 8 pairs of elongated slots and 8 magnetic poles are shown. It should be understood by those skilled in the art that the specific number is only illustrative here and not limited.

Figure 4:
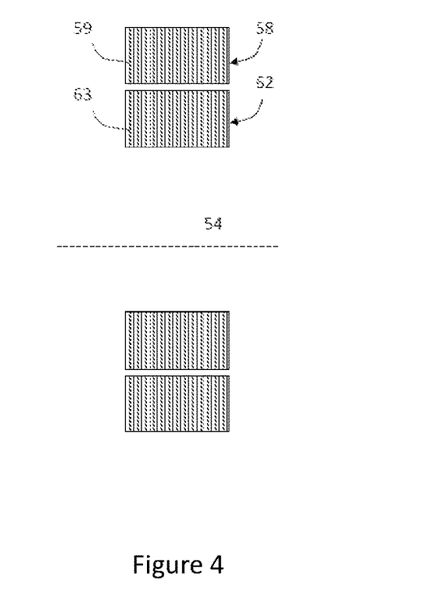
FIG. 4 shows a partial axial cross-sectional view of a representative electric machine according to one or more embodiments of the present disclosure.

FIG. 4 shows an axial cross-sectional view of part of the electric machine 42. In one or more embodiments, the rotor 46 includes a rotor core 62 formed of one or more rotor laminations 63. The stator 44 may include a stator core 58 formed of one or more stator laminations 59. The rotor core 62 rotates relative to the stator core 58 about an axis 54.

Figure 6:
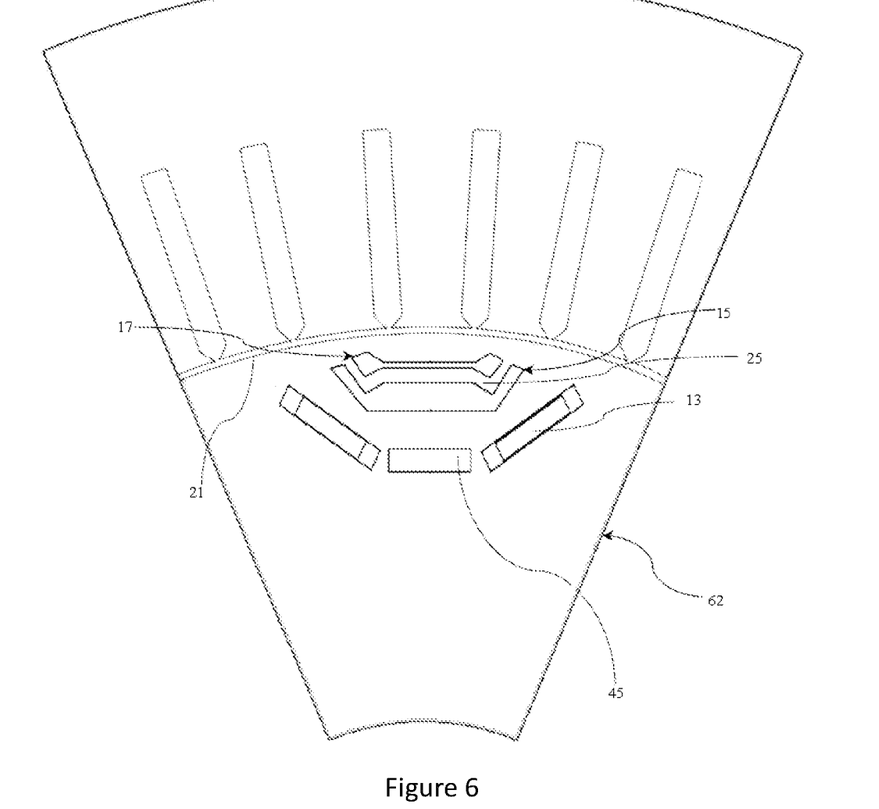
FIG. 6 shows a partial radial cross-sectional view of an electric machine including an electric machine rotor according to one or more embodiments of the present disclosure.

Referring now to FIG. 2, FIG. 3, and FIG. 6, a partial radial cross-sectional view of an electric machine including an electric machine rotor according to one or more embodiments of the present disclosure is shown. The electric machine rotor 46 includes a rotor core 62. The rotor core 62 includes a plurality of pairs of magnets 13 circumferentially distributed along the rotor core 62, and each pair of magnets 13 jointly forms a V-shaped configuration 16 with an opening facing an outer periphery 21 of the rotor core 11. The rotor core 62 also includes a first slot 15 and a second slot 17 inside the V-shaped configuration 16, which includes a generally rectangular middle portion 45 rather than a conventional "V" that has sides connected in a vertex. The first slot 15 and the second slot 17 are apertures or openings through the rotor lamination 63, between which part of the rotor lamination 63 forms a magnetic bridge 25. Both sides or wings of the magnetic bridge 25 are respectively bent or angled in a direction of the outer periphery 21. At least part of the middle portion of the magnetic bridge 25 is bent or angled away from the direction of the outer periphery 21, best shown in FIG. 8. Those skilled in the art can understand that the portion angled in the direction of the outer periphery 21 may be of any shape, for example, it may be one or more protruding triangular, rectangular, or trapezoidal shape, and may include portions "b" that extend away from the outer periphery 21 in addition to portions "c" that extend toward the outer periphery 21. In the context of the present disclosure, "circumferentially distributed" means that several pairs of magnets 13 are distributed in a circumferential shape around a rotation axis 54 of the rotor core 62.

Figure 5:
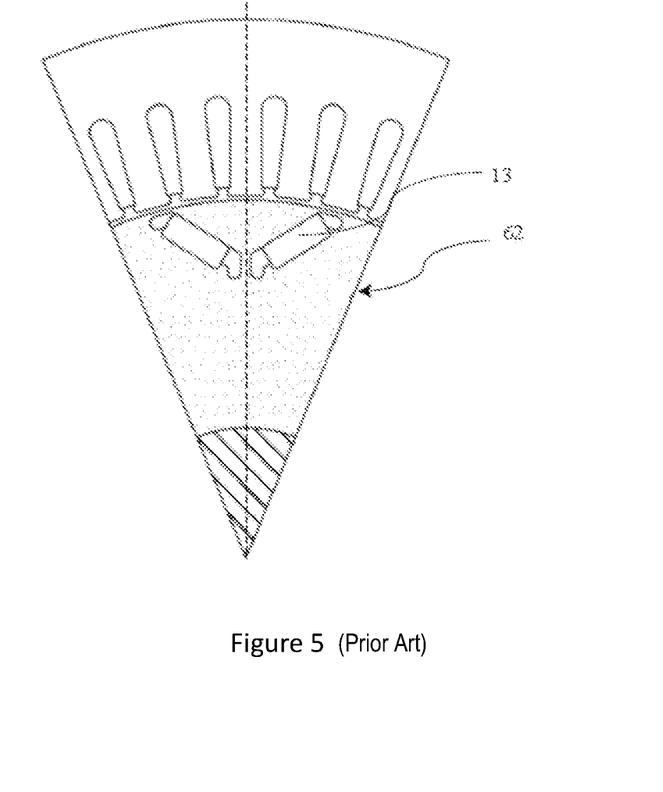
FIG. 5 shows a partial cross-sectional view of an electric machine in the prior art.

Compared with the rotor of the present disclosure, the rotor in the prior art (as generally represented in FIG. 5) usually does not include the design of the first slot 15, the second slot 17 and the magnetic bridge 25 with a region between the sides of the V-shaped configuration 16 formed by each pair of magnets 13 and the outer periphery 21.

In one or more embodiments, the magnet 13 may include one or more of the following: ferrite magnets, AlNiCo magnets, rare earth magnets (such as, but not limited to, neodymium-iron-boron (NeFeB)), and the like. In one or more embodiments, the magnets 13 may each be formed as a single piece of magnet. In other embodiments, the magnet 13 may also be formed by stacking a plurality of magnet blocks.

Figure 7:
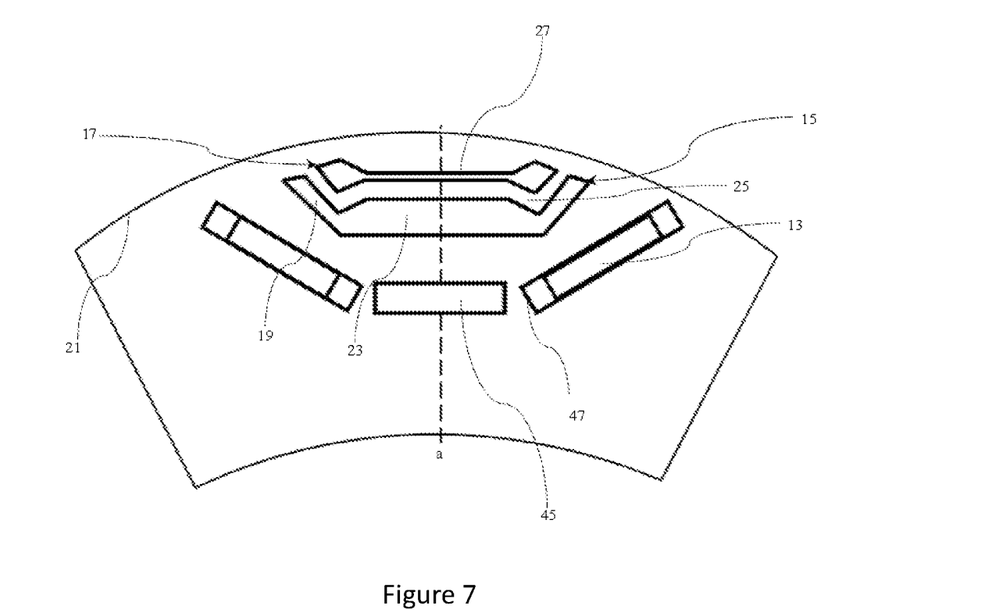
FIG. 7 shows a partial enlarged view of an electric machine rotor according to one or more embodiments of the present disclosure.
Figure 8:
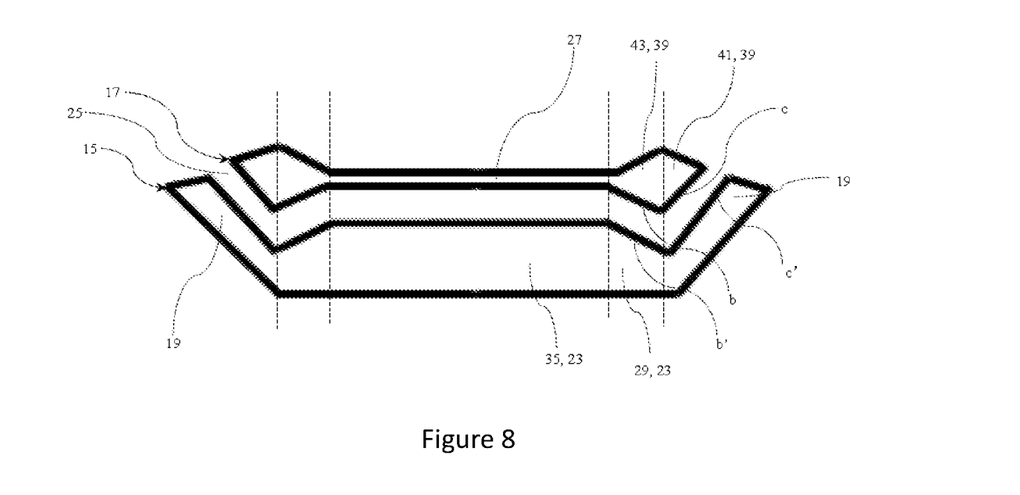
FIG. 8 shows an enlarged view of a first slot and a second slot of an electric machine rotor according to one or more embodiments of the present disclosure.

According to some embodiments of the present disclosure, referring to FIG. 7 and FIG. 8, the second slot 17 is located between the first slot 15 and the outer periphery 21 and is perpendicular to a central axis or axis of symmetry of the V-shaped configuration 16. The first slot 15 has side wing portions 19 located on both sides, and the side wing portions 19 are inclined toward the second slot 17. The first slot 15 also includes a first main body portion 23 between the side wing portions 19, and the first body portion 23 is parallel to the main body of the second slot 17 and widens toward the direction of the second slot 17 in a part of a middle portion (such as the portion 35). In this embodiment, the widened portion forms a kind of an "arch". In some embodiments, the central axis "a" of the V-shaped configuration 16 extends through the rotation axis 54 of the rotor core 62.

In some further embodiments, referring to FIG. 8, the first main body portion 23 includes a transition area 29 at both ends and a platform area 35 in the middle. The transition area 29 has a side b' that faces the second slot 17 and slopes from the side wing portion 19 to the direction of the second slot 17. The platform area 35 has sides that are parallel to each other. In some other embodiments, sides of the platform area 35 and the transition area 29 away from the second slot 17 are aligned with each other to form a straight line.

According to several further embodiments, as shown in FIG. 8, the second slot 17 has a narrowed second main body portion 27 in a middle portion, and the second main body portion 27 corresponds to and is parallel to the platform area 35 of the first slot 15.

In some further embodiments, the second slot 17 further includes widened portions 39 located on both sides of the second main body portion 27. Each widened portion 39 includes an end side area 41 located at the end of the second slot 17 and a connection area 43 connecting the end side area 41 to the second main body portion 27. The connection area 43 has a side "b" that faces the first slot 15 and is parallel to the adjacent side b' of the transition area 39 of the first slot 15. The end side area 41 has a side "c" that faces the first slot 15 and is parallel to the adjacent side c' of the side wing portion 19 of the first slot 15.

In some embodiments of the present disclosure, referring to FIG. 8, the widened portions 39 of the second slot 17 have a maximum width greater than or equal to twice a width of the second main body portion 27. According to some further embodiments, the widened portions 39 of the second slot 17 have a maximum width greater than or equal to three times a width of the second main body portion 27. The maximum width of the widened portion 39 of the second slot 17 may be the width where the connection area 43 and the end side area 41 adjoin.

In some embodiments of the present disclosure, referring to FIG. 8, the platform area 35 of the first slot 15 has a width greater than or equal to 2 times a width of the side wing portion 19 of the first slot 15. According to some further embodiments, the platform area 35 of the first slot 15 has a width greater than or equal to 3 times a width of the side wing portion 19 of the first slot 15. Wherein, the width of the side wing portion 19 of the first slot 15 is measured perpendicular to the side (such as the side c') of the side wing portion 19. In some further embodiments, the first slot 15 and the second slot 17 are symmetrical about the central axis a of the V-shaped configuration 16, respectively.

According to several embodiments of the present disclosure, referring to FIGS. 7 and 8, the magnetic bridge 25 has a uniform width in all parts, wherein the width of each part of the magnetic bridge 25 is measured perpendicular to the side of the corresponding part of the magnetic bridge 25. In some further embodiments, the magnetic bridge 25 is symmetrical about the central axis "a" of the V-shaped configuration 16.

In some embodiments of the present disclosure, referring to FIGS. 6 and 7, the rotor core 62 further includes a groove-shaped portion 45 located radially inward of the magnetic bridge 25. Wherein, the groove-shaped portion 45 is a hole penetrating the rotor lamination 63. In some further embodiments, the groove-shaped portion 45 is located between the radially inward ends 47 of each pair of magnets 13 constituting the V-shaped configuration 16. In other words, the groove-shaped portion 45 is located near the narrowed end of the V-shaped configuration 16. In other embodiments, the groove-shaped portion 45 is symmetrical about the central axis a of the V-shaped configuration 16.

Table 1 shown below provides representative values for the torque ripple of the electric machines according to a conventional design as compared to a design according to the present disclosure under the $24^{th}$, $48^{th}$ and $96^{th}$ mechanical frequencies at a rotation speed of 1000 rpm. The representative conventional design does not include the first slot 15, the second slot 17 and the magnetic bridge 25 inside the V-shaped configuration 16 formed by each pair of magnets 13 according to this disclosure. It can be seen that the torque ripple of the electric machine according to the present disclosure has been significantly reduced/improved compared with the conventional design under the 24th, $48^{th}$ and $96^{th}$ mechanical frequencies, and the pulsation percentage has been reduced from 1.60%, 3.39% and 3.34% to 1.52%, 1.53% and 1.33%, respectively. The smaller values are associated with smaller ripple, smoother torque output, and lower noise.

TABLE 1

|  | Conventional Design | | Present Disclosure | |
| --- | --- | --- | --- | --- |
| Harmonics | Torque/Nm | Pulsation Percentage/% | Torque/Nm | Pulsation Percentage/% |
| Fundamental Waveform Torque | 44.187 | 100% | 48.85 | 100% |
| $24^{th}$ | 0.705 | 1.60% | 0.746 | 1.52% |
| $48^{th}$ | 1.498 | 3.39% | 0.679 | 1.53% |
| $96^{th}$ | 1.476 | 3.34% | 0.653 | 1.33% |

According to another aspect of the present disclosure, referring again to FIGS. 2-8, an electric machine rotor 46 including a rotor core 62 is provided. The rotor core 62 comprises pairs of permanent magnets 13 circumferentially distributed along the rotor core 62, and each pair of permanent magnets 13 jointly form a V-shaped configuration 16 with an opening facing an outer periphery 21 of the rotor core 62. The rotor core 62 further comprises a first slot 15 and a second slot 17 inside the V-shaped configuration 16. The first slot 15 and the second slot 17 are holes penetrating the rotor lamination 63, between which part of the rotor lamination 63 forms an magnetic bridge 25. Both sides of the magnetic bridge 25 are respectively bent in a direction of the outer periphery 21. Wherein, at least a part of a middle portion of the magnetic bridge 25 is offset toward the direction of the outer periphery 21 to form an arch. It should be understood that all the embodiments, features and advantages described above for the electric machine rotor according to the first aspect of the present disclosure are equally applicable to the electric machine rotor according to the other aspect of the present disclosure, provided that they do not conflict with each other. That is to say, all the above-mentioned embodiments and their variants can be directly transferred and combined with this. For the sake of brevity of the present disclosure, the description will not be repeated here.

According to yet another aspect of the present disclosure, referring to FIG. 2, a vehicle electric machine 14 is also provided, comprising the electric machine rotor 46 described in any of the above embodiments. Likewise, all the embodiments, features and advantages described above for the electric machine rotor 46 according to the present disclosure are equally applicable to the vehicle electric machine 14 according to the present disclosure, and will not be repeated here.

In summary, compared with the prior art, the present disclosure proposes an electric machine rotor and a vehicle electric machine containing the same, which can significantly reduce torque ripple by simply changing the local topology of the rotor laminations without reducing the torque, thereby improving output stability and reducing the overall energy consumption of the electric machine.

Where it is technically possible, the technical features listed in relation to different embodiments can be combined with each other to form further embodiment within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present disclosure and are given only for the purpose of enabling those skilled in the art to clearly understand the principles of the claimed subject matter. It should be understood by those skilled in the art that the above discussion to any embodiment is only illustrative, and is not intended to imply that the disclosed scope of the embodiments of the present disclosure (including claims) is limited to these examples; under the overall concept of the disclosure, the technical features in the above embodiments or different embodiments can be combined with each other to produce many other their variants in different aspects of embodiments that may not be described or illustrated for the sake of brevity. Therefore, any omission, modification, equivalent replacement, improvement, etc. made according to the teachings of the disclosure shall be included in the intended scope of the claimed subjection matter.

What is claimed is:

1. An electric machine rotor including a rotor core, the rotor core comprising:
    pairs of magnets circumferentially distributed along the rotor core, each pair of magnets jointly forming a V-shaped configuration with an opening facing an outer periphery of the rotor core; and
    a first slot and a second slot between the V-shaped configuration and the outer periphery of the rotor core forming a magnetic bridge therebetween, the magnetic bridge including side portions being respectively bent in a direction of the outer periphery, and at least a part of a middle portion of the magnetic bridge being angled toward the direction of the outer periphery wherein the rotor core further includes a groove-shaped portion located radially inward of the magnetic bridge, and wherein the groove-shaped portion is located between radially inward ends of each pair of magnets forming the V-shaped configuration.

2. The electric machine rotor of claim 1, wherein the second slot is located between the first slot and the outer periphery and is perpendicular to a central axis of the V-shaped configuration, and the first slot has side wing portions on both sides that are inclined to the direction of the second slot with a first main body portion between the side wing portions that includes a first middle portion that is parallel to a second middle portion of the second slot, the first main body widening toward the second slot in the first middle portion.

3. The electric machine rotor of claim 2, wherein the first main body portion includes a transition area at both ends and a platform area in the first middle portion, the transition area has a side that faces the second slot and slope from the side wing portion to the direction of the second slot, and the platform area has sides that are parallel to each other.

4. The electric machine rotor of claim 3, wherein the second middle portion of the second slot is narrowed to form a second main body portion that corresponds to, and is parallel to the platform area of the first slot.

5. The electric machine rotor of claim 4, wherein the second slot further includes widened portions located on both sides of the second main body portion, each of the widened portions includes an end side area and a connection area connecting the end side area to the second main body portion, the connection area has a side that faces the first slot and is parallel to the adjacent side of the transition area of the first slot, and the end side area has a side that faces the first slot and is parallel to the adjacent side of the side wing portion of the first slot.

6. The electric machine rotor of claim 5, wherein the widened portions of the second slot have a maximum width greater than or equal to twice a width of the second main body portion.

7. The electric machine rotor of claim 3, wherein the platform area of the first slot has a width greater than or equal to twice a width of the side wing portion of the first slot.

8. The electric machine rotor of claim 1, wherein the magnetic bridge has a uniform width.

9. An electric machine rotor including a rotor core, the rotor core comprising:
    pairs of permanent magnets circumferentially distributed around the rotor core, each pair of permanent magnets jointly forming a V-shaped configuration with an opening facing an outer periphery of the rotor core; and
    a first slot and a second slot inside the V-shaped configuration, between which a magnetic bridge being formed, both sides of the magnetic bridge being respectively bent in a direction of the outer periphery, and at least a part of a middle portion of the magnetic bridge being offset toward the direction of the outer periphery,
    wherein the second slot is located between the first slot and the outer periphery and is perpendicular to a central axis of the V-shaped configuration, and the first slot has side wing portions on both sides that are inclined to the direction of the second slot and a first main body portion that is parallel to the second slot and widens toward the direction of the second slot in a part of a middle portion,
    wherein the first main body portion includes a transition area at both ends and a platform area in the middle, the transition area has a side that faces the second slot and slope from the side wing portion to the direction of the second slot, and the platform area has sides that are parallel to each other, and
    wherein the platform area of the first slot has a width greater than or equal to 2 times a width of the side wing portion of the first slot.

10. The electric machine rotor of claim 9, wherein the second slot is narrowed in a middle portion to form a second main body portion that corresponds to and parallel to the platform area of the first slot.

11. The electric machine rotor of claim 10, wherein the second slot further includes widened portions located on both sides of the second main body portion, each of the widened portions includes an end side area and a connection area connecting the end side area to the second main body portion, the connection area has a side that faces the first slot and is parallel to the adjacent side of the transition area of the first slot, and the end side area has a side that faces the first slot and is parallel to the adjacent side of the side wing portion of the first slot.

12. The electric machine rotor of claim 11, wherein the widened portions of the second slot have a maximum width greater than or equal to 2 times a width of the second main body portion.

13. The electric machine rotor of claim 9, wherein the magnetic bridge has a uniform width in all parts.

14. The electric machine rotor of claim 9, wherein the rotor core further includes a groove-shaped portion located radially inward of the magnetic bridge.

15. An electric machine including a rotor according to claim 14.

* * * * *